United States Patent [19]

Nespor

[11] Patent Number: 5,061,147
[45] Date of Patent: * Oct. 29, 1991

[54] VEHICLE CARRIER WITH WHEEL LIFT

[75] Inventor: Ronald R. Nespor, Sharpsville, Pa.

[73] Assignee: Chevron, Inc., Mercer, Pa.

[*] Notice: The portion of the term of this patent subsequent to May 29, 2007 has been disclaimed.

[21] Appl. No.: 538,742

[22] Filed: Jun. 15, 1990

Related U.S. Application Data

[63] Continuation of Ser. No. 288,854, Dec. 23, 1988, abandoned, which is a continuation of Ser. No. 204,642, Jun. 9, 1988, Pat. No. 4,929,142.

[51] Int. Cl.$^5$ ............................................. B60J 9/00
[52] U.S. Cl. ................................. 414/563; 280/402; 414/480; 298/12
[58] Field of Search ............. 414/563, 477, 478, 479, 414/480; 298/12, 13, 14, 15, 16, 17 B; 280/402

[56] References Cited

U.S. PATENT DOCUMENTS

| | | | |
|---|---|---|---|
| 1,113,191 | 10/1914 | Breese . | |
| 1,858,797 | 5/1932 | Wood et al. . | |
| 1,929,112 | 10/1933 | Hansen . | |
| 1,931,746 | 10/1933 | Allsworth et al. . | |
| 2,065,833 | 12/1936 | Stratton et al. . | |
| 2,183,478 | 12/1939 | Holmes et al. | 212/141 |
| 2,194,403 | 3/1940 | Novotney . | |
| 2,462,868 | 3/1949 | Ives . | |
| 2,468,220 | 4/1949 | McLendon . | |
| 2,509,167 | 5/1950 | Pla | 298/12 |
| 2,613,827 | 10/1952 | Van Doorne . | |
| 2,621,814 | 12/1952 | Lisota . | |
| 2,624,484 | 1/1953 | Dalton . | |
| 2,630,929 | 3/1953 | Pearson . | |
| 2,683,545 | 7/1954 | Wood . | |
| 2,703,658 | 3/1955 | Bazzell . | |
| 2,850,187 | 9/1958 | Roberts . | |
| 3,182,829 | 5/1965 | Wagner . | |
| 3,430,792 | 3/1969 | Grove et al. . | |
| 3,550,801 | 10/1968 | Larson . | |
| 3,667,631 | 6/1972 | Bishop . | |
| 4,222,698 | 9/1980 | Boelter | 414/477 |
| 4,318,657 | 3/1982 | Zaidaric | 414/478 |
| 4,473,237 | 9/1984 | Lind | 280/402 |
| 4,557,496 | 10/1985 | Sill | 280/402 |
| 4,637,623 | 1/1987 | Bubik | 280/402 |
| 4,679,978 | 7/1987 | Holmes et al. | 414/563 |
| 4,741,661 | 5/1988 | Carey | 414/563 |
| 4,750,856 | 6/1988 | Lapiolahti | 414/563 |
| 4,761,015 | 8/1988 | Carr | 280/402 |
| 4,775,285 | 10/1988 | Zackovich | 414/563 |
| 4,795,303 | 1/1989 | Bubik | 414/478 |
| 4,797,057 | 1/1989 | Shoup et al. | 414/563 |
| 4,815,915 | 3/1989 | Crupi, Jr. | 414/563 |

FOREIGN PATENT DOCUMENTS 260213 5/1964 Australia .
535506 9/1931 Fed. Rep. of Germany .

Primary Examiner—Frank E. Werner
Attorney, Agent, or Firm—Buchanan Ingersoll; Michael L. Dever

[57] ABSTRACT

A combination tilting bed carrier and attached wheel lift for mounting on a chassis of a towing vehicle wherein the bed carrier is pivotably connected to the chassis and first motive devices extend between the chassis and the bed carrier for tilting the bed carrier. The wheel lift is positioned below the bed carrier and pivotably connected thereto. Second motive devices extend between the wheel lift and the bed carrier for independently tilting the wheel lift relative to the bed carrier and the chassis.

13 Claims, 3 Drawing Sheets

VEHICLE CARRIER WITH WHEEL LIFT

This application is a continuation of Ser. No. 07/288,854, filed 12/23/88, now abandoned which is a continuation of Ser. No. 07/204,642, filed 6/9/88, now U.S. Pat. No. 4,929,142.

This invention relates to a combination tilting bed vehicle carrier and attached wheel lift for mounting on a towing vehicle.

More particularly, this invention relates to a subframe structure for a tilting bed carrier which includes strut members for load distribution within the subframe. The load which is distributed by the strut members tends to counteract the bending and torsion forces imposed on the subframe structure by the towed vehicle carried by the rear wheel lift. The subframe bending forces are primarily due to the weight of the vehicle on the wheel lift and the subframe torsion forces arise due to uneveness or holes in the road which can cause one side of the vehicle in the wheel lift to ride at a higher level than the other, imparting a twisting force to the subframe structure.

More particularly, this invention relates to a combination tilting bed carrier and attached wheel lift apparatus for mounting on the chassis of a towing vehicle. The tilting bed carrier comprises first and second elongated beams for supporting a sliding tilting bed platform. The beams each have a forward end relatively near the cab of the towing vehicle and a rearward end relatively remote from the cab of the towing vehicle. Brace means secure the parallel beams in a spaced apart parallel relationship.

First bracket means are secured to and extend downwardly from the first beam. Second bracket means are secured to and extend downwardly from the second beam. The first and the second bracket means depend from similar longitudinal positions on the beams. First chassis pivot means is used for pivotally securing the first bracket to the chassis. Second chassis pivot means is used for pivotally securing the second bracket to the chassis.

The wheel lift is positioned below the beams. The wheel lift includes swingable telescopic tube means. The rearward end of the telescopic tube means extends rearwardly of the tilting bed carrier for lifting the wheels of a towed vehicle. Tube pivot means supported by the first and second brackets is provided for pivotally mounting the front end of the telescopic tube means so that the telescopic tube means is swingable thereon.

First strut means is provided having a forward end and a rearward end. Second strut means is also provided having a forward end and a rearward end. The forward end of the first strut means is fixedly secured to the first beam at a position on the first beam forwardly of the first bracket and the rearward end of the first strut is mounted on a first strut pivot supported by the first and second brackets. The forward end of the second strut is secured to the second beam at a position on the second beam forwardly of the second bracket and the rearward end of the second strut is mounted on a second strut pivot supported by the first and second brackets.

Motive means is attached to the tilting bed carrier forwardly of the strut means to tilt the bed upwardly at its forward end while pivoting about the first and second chassis pivot means.

The apparatus can employ an axle extending between and supported by the first and second brackets. The first strut pivot can comprise first collar means secured to the rearward end of the first strut means and mounted around the axle for pivoting the first strut means on the axle. The second strut pivot can comprise second collar means secured to the rearward end of the second strut means and mounted around the axle for pivoting the second strut means on the axle. If desired, third collar means can be secured to the forward end of the telescopic tube means and mounted about the axle to comprise the tube pivot means.

In the apparatus, the first and second bracket means are located to the rear of the rear wheels on the chassis and the forward ends of the first and second strut means are fixedly secured to the first and second beams, respectively, at a position on the beams forwardly of the rear wheels.

This invention will be more clearly understood by reference to the accompanying figures in which FIG. 1 is a side view of the subframe structure of the tilting bed carrier;

Figure 1:
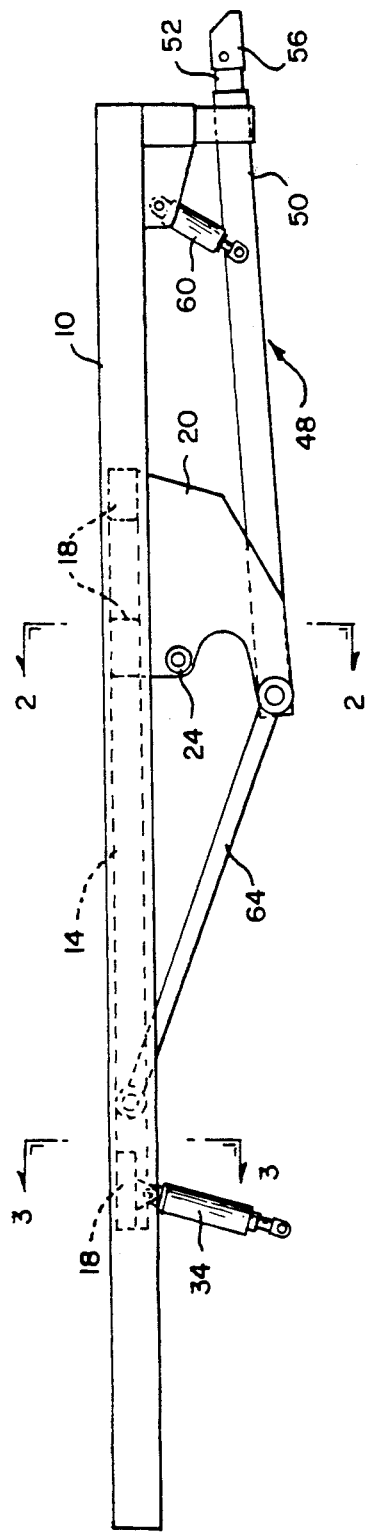

Referring to the drawings, the subframe comprises first and second parallel longitudinal steel beams 10 and 12. Beams 10 and 12 are provided with integral internal reinforcing bars 14 and 16. Reinforcing bars 14 and 16 are optional and can be employed if required. Beams 10 and 12 are maintained in parallel spaced-apart relationship by means of a plurality of braces 18.

First bracket means 20 is secured at an interior surface of beam 10 or reinforcing bar 14 and extends downwardly from beam 10. Second bracket means 22 is secured at an interior surface of beam 12 or reinforcing bar 16 and extends downwardly from beam 12. Bracket 20 is provided with pivot means 24 and bracket 22 is provided with pivot means 26. Pivot means 24 and 26 serve to pivot the subframe assembly to chassis member 32 of a towing vehicle, as shown in FIG. 5.

Figure 5:
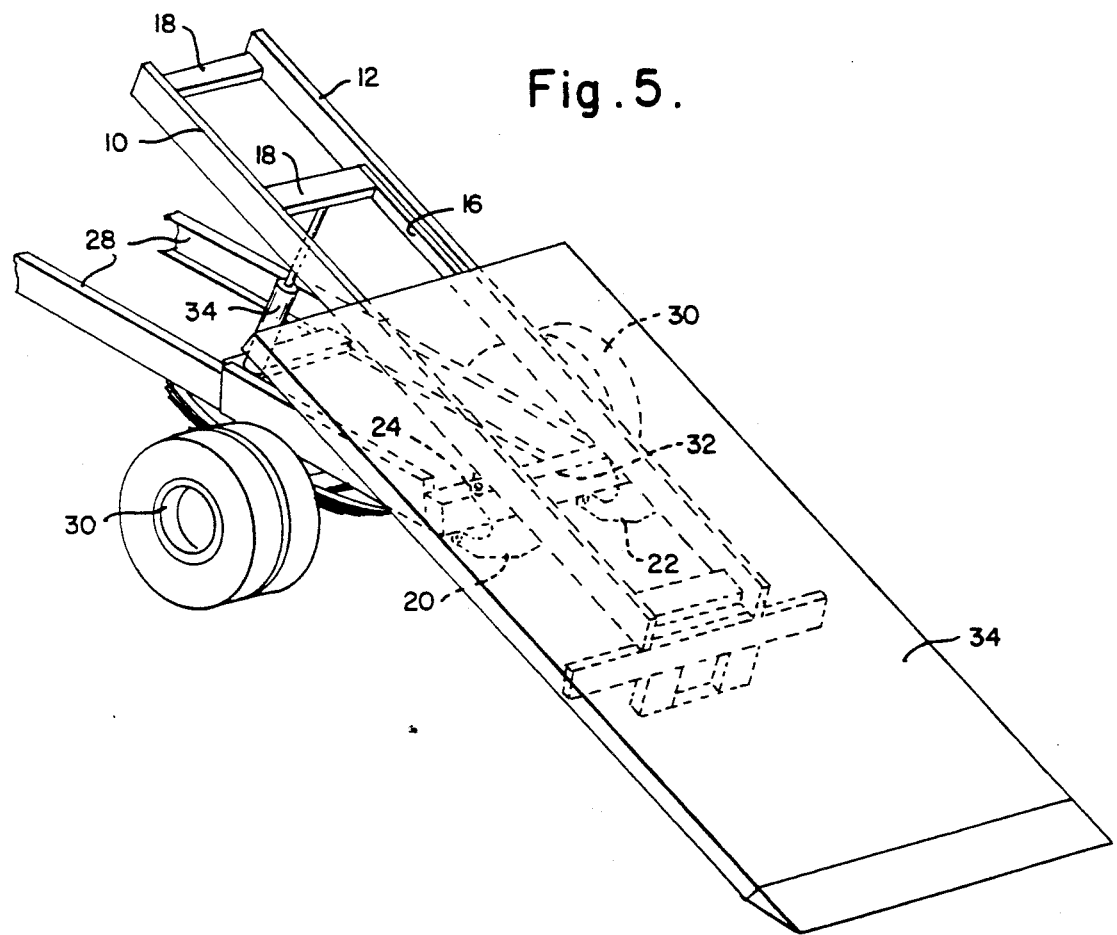
FIG. 5 is an isometric view of the subframe structure attached to a vehicle chassis and in tilted position.

Referring to FIG. 5, a towing vehicle having chassis frame members 28 and 32 with a set of vehicle rear wheels 30 is provided with a tiltable subframe comprising parallel beams 10 and 12 and a series of braces 18. Beams 10 and 12 are provided with depending brackets 20 and 22, respectively. Each beam is pivoted on the chassis frame. Beam 10 is pivoted on chassis member 32 at pivot 24, shown in FIGS. 2, 4 and 5, and beam 12 is similarly pivoted to chassis member 32 at pivot 26, shown in FIG. 2 but hidden in FIGS. 4 and 5. Pivots 24 and 26 are mounted on the chassis at a position to the rear of wheels 30.

Hydraulic jack 34 can be mounted between a member of the chassis frame and a member of the subframe, as shown in FIG. 5, to tilt the subframe upwardly at its forward end. It will be understood that more than one hydraulic jack can be employed. Thereupon, platform 34 can be forced to slide downwardly to gound level to receive a vehicle to be carried on the platform. After the carried vehicle is driven onto the platform, hydraulic jack 34 is retracted, allowing the subframe and platform with vehicle to resume a horizontal position. Thereupon, the platform with vehicle can be pulled forwardly toward the cab, not shown, at the front of the towing vehicle by means of any device, such as a winch, not shown.

Figure 3:
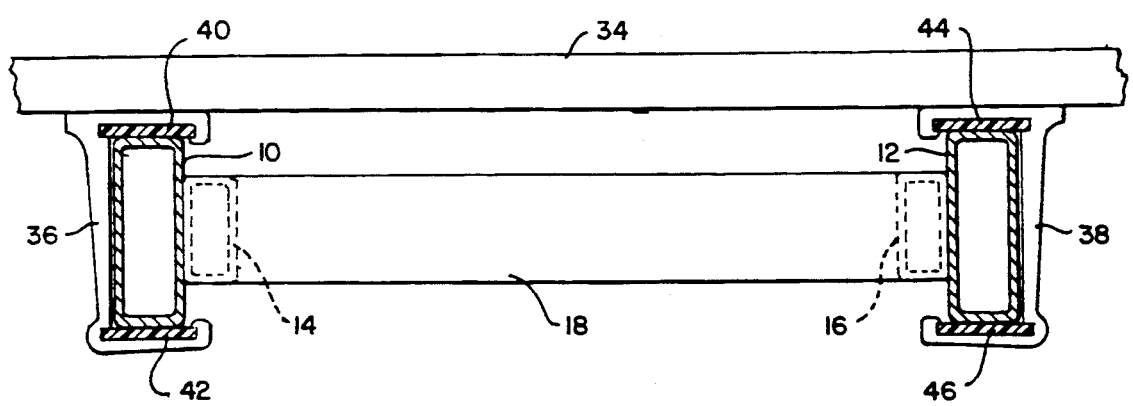
FIG. 3 is a view taken through the section 3—3 of FIG. 1 with sliding platform added.

FIG. 3 shows that the underside of platform 34 is provided with a pair of guide members 36 and 38 which partially enclose subframe beams 10 and 12, respectively. Guide member 36 is provided with internal upper and lower plastic strips 40 and 42 and guide member 38 is provided with internal upper and lower plastic strips 44 and 46. The plastic strips are low friction members which allow platform 34 to slide back and forth on beams 10 and 12.

Wheel lift assembly 48 is mounted at the rear of and below subframe beams 10 and 12. The wheel lift assembly comprises extendable and retractable telescoping tube members 50 and 52. At the rearward end of member 52 is mounted laterally extending expandable sleeve assembly 54. Laterally extending sleeve assembly 54 has a pair of end shoes 56 and 58 to receive wheel cradle means, not shown, for lifting the wheels of a towed automotive vehicle. The connector arm assembly in shoes 56 and 58 is shown in my patent application entitled Quick Couple L-Bar Sleeve Assembly For Wheel Lift; Ser. No. 204,454, filed June 9, 1988, now U.S. Pat. No. 4,929,142.

Figure 2:
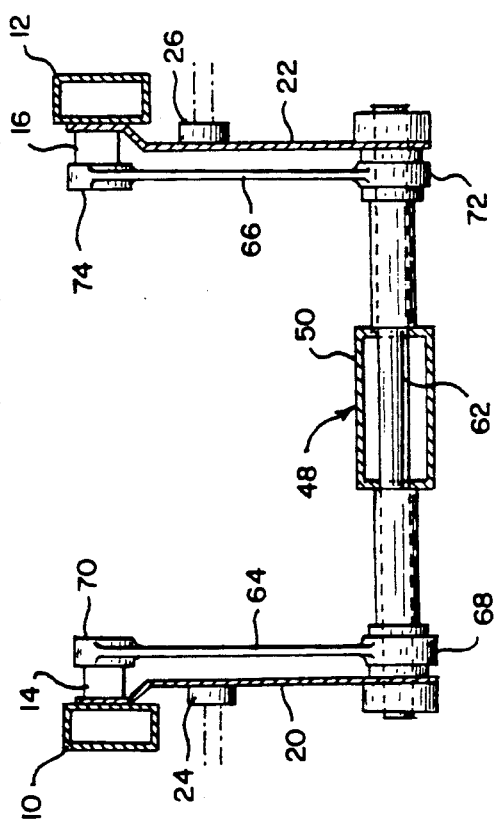
FIG. 2 is a view taken through the section 2—2 of FIG. 1.
Figure 4:
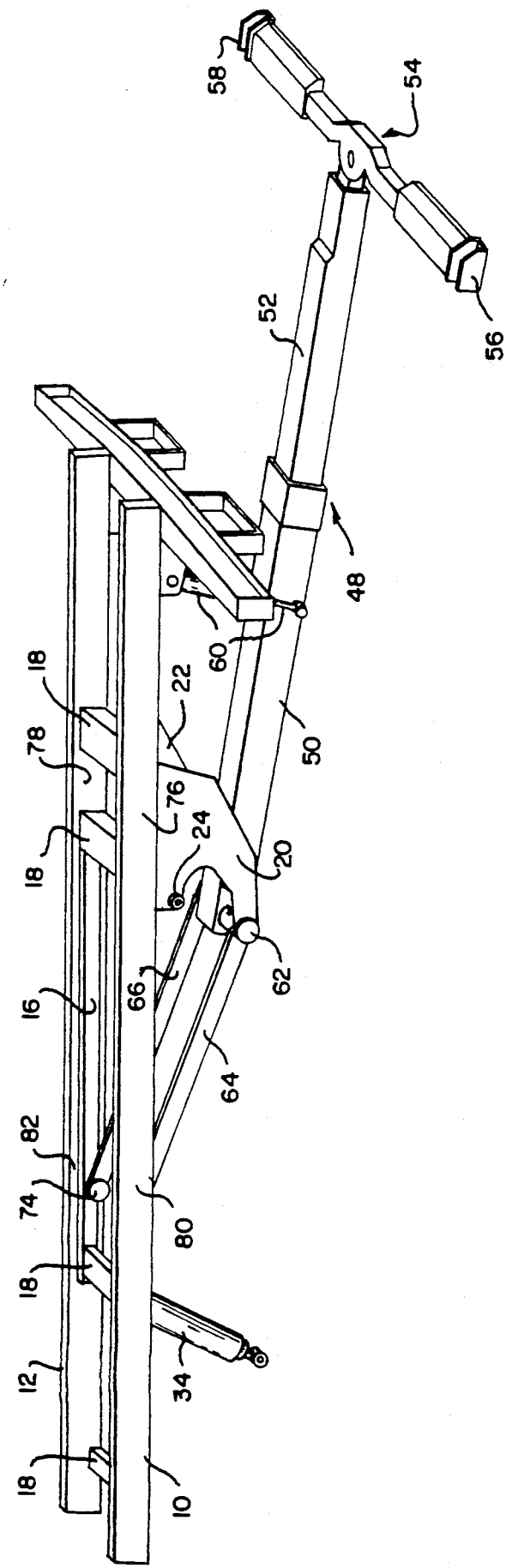
FIG. 4 is an isometric view of the subframe structure with attached wheel lift.

Wheel lift assembly 48 is swung upwardly and downwardly in a vertical arc by means of hydraulic motive 60. FIG. 2 shows a cross-section of the rear of wheel lift tube 50 provided with side openings, not shown, so that tube 50 is swingably pivoted centrally on axle 62 which is mounted between brackets 20 and 22. As shown in FIGS. 2 and 4, first strut 64 and second strut 66 each have one end pivoted on axle 62 and the other end fixedly secured to a subframe beam. As shown in FIG. 2, first strut 64 is pivoted at its lower end on axle 62 by means of collar 68 and is fixedly secured at its upper end to reinforcing bar 14 by means of boss 70. Second strut 66 is pivoted at its lower end on axle 62 by means of collar 72 and is fixedly secured at its upper end to reinforcing bar 16 by means of boss 74. Struts 64 and 66 are pivoted on opposite ends of axle 62, respectively.

As is shown in co-filed application Serial Number wheel lift 48 is adapted to lift two wheels of a towed vehicle. This will result in a downward force on brackets 20 and 22 and on beams 10 and 12 at the similar longitudinal positions 76 and 78 on beams 10 and 12 corresponding to the locations of brackets 20 and 22, respectively. The localized downward force at positions 76 and 78, shown in FIG. 4, tends to induce localized bending in beams 10 and 12 at positions 76 and 78. The use of struts 64 and 66 distributes a portion of the downward force of the towed vehicle to positions 80 and 82 on beams 10 and 12, respectively, thereby tending to distribute the downward load away from positions 76 and 78 and to reduce the bending stress at positions 76 and 78.

Struts 64 and 66 also tend to reduce torsion stress tending to occur at beams 10 and 12. During towing of the vehicle carried on wheel lift 48, prevailing road conditions, such as a pothole or a sidewardly sloping roadway, will tend to induce twisting stresses at positions 76 and 78 on beams 10 and 12, tending to distort the beams. However, struts 64 and 66 tend to distribute the twisting stresses from positions 76 and 78 to positions 80 and 82 on beams 10 and 12, thereby avoiding excessive localized twisting stresses.

I claim:

1. A combination tilting bed carrier and attached wheel lift apparatus for mounting on a chassis of a towing vehicle comprising,
   a bed carrier for supporting vehicles in tow,
   a first pair of pivot points positioned laterally, oppositely of one another on said bed carrier for pivotally connecting said bed carrier to the chassis,
   first motive means extending between the chassis and said bed carrier for actuating tilting of said bed carrier about said first pair of pivot points relative to said chassis,
   a wheel lift positioned below said bed carrier and extending rearwardly thereof,
   a second pair of pivot points positioned laterally, oppositely of one another on said bed carrier for pivotally connecting said wheel lift to said bed carrier, and
   second motive means extending between said wheel lift and said bed carrier for actuating tilting of said wheel lift about said second pair of pivot points relative to said bed carrier and the chassis.

2. A combination tilting bed carrier and attached wheel lift apparatus for mounting on a chassis of a towing vehicle comprising,
   a bed carrier for supporting vehicles in tow,
   a pair of brackets connected laterally, oppositely of one another to said bed carrier and extending downwardly therefrom,
   first pivot means positioned on said pair of brackets for pivotally connecting said bed carrier to the chassis,
   first motive means extending between the chassis and said bed carrier for actuating tilting of said bed carrier about said first pivot means relative to the chassis,
   a wheel lift positioned below said bed carrier and extending rearwardly thereof,
   second pivot means positioned on said pair of brackets for pivotally connecting said wheel lift to said bed carrier, and
   second motive means extending between said wheel lift and said bed carrier for actuating tilting of said wheel lift about said second pivot means relative to said bed carrier and the chassis.

3. A combination tilting bed carrier and attached wheel lift apparatus for mounting on a chassis of a towing vehicle comprising,
   a bed carrier for supporting vehicles in tow, said bed carrier including first and second elongated beams for supporting a tilting bed platform,
   said beams each having a forward end relatively near a cab of the towing vehicle and a rearward end relatively remote from the cab of the towing vehicle,
   brace means for securing said beams in a spaced apart parallel relationship,
   a first bracket secured to and extending downwardly from said first beam,
   a second bracket secured to and extending downwardly from said second beam, said first and second brackets depending from similar longitudinal positions on said beams,
   first pivot means for pivotally securing said first bracket to said chassis,
   second pivot means for pivotally securing said second bracket to said chassis,
   a wheel lift positioned below said beams and extending rearwardly thereof, said wheel lift including a swingable telescopic tube, a rearward end of said telescopic tube extending rearwardly of said bed carrier for lifting the wheels of a towed vehicle, tube pivot means supported by said first and second brackets for pivotally mounting the front end of said telescopic tube to said bed carrier so that said telescopic tube is swingable thereon, first motive means extending between the chassis and said bed carrier forwardly of said first and second brackets for actuating tilting of said bed carrier upwardly at the forward end about said first and second pivot means, and second motive means extending between said bed carrier and said telescopic tube for actuating swinging of said telescopic tube relative to said bed carrier and the chassis.

4. Apparatus as set forth in claim 3 wherein, said tube pivot means includes an axle between said first and second brackets, a collar on said axle, and said collar being secured to the forward end of said telescopic tube for pivoting said telescopic tube on said axle.

5. Apparatus as set forth in claim 3 including, a platform mounted on said first and second elongated beams, and guide means for slidably receiving said first and second elongated beams to permit said platform to slide back and forth on said first and second elongated beams.

6. Apparatus as set forth in claim 3 including, a pair of wheel cradle means positioned at a rearward end of said telescopic tube for receiving the wheels of a towed vehicle.

7. Apparatus as set forth in claim 3 including, rear wheels connected to said chassis, and said first and second brackets being positioned to the rear of said rear wheels.

8. A tilting bed carrier apparatus for mounting on a chassis of a towing vehicle comprising, a bed carrier for supporting vehicle in tow, said bed carrier including first and second elongated beams for supporting a tilting bed platform, said beams each having a forward end located relatively near a cab of the towing vehicle and a rearward end located relatively remote from the cab of the towing vehicle, brace means for securing said beams in a spaced apart parallel relationship, a first bracket secured to and extending downwardly from said first beam, a second bracket secured to and extending downwardly from said second beam, said first and second brackets depending from similar longitudinal positions on said beams, said first bracket being pivotally secured to the chassis on the side of the chassis relatively near said first beam, said second bracket being pivotally secured to the chassis on the said of the chassis relatively near said second beam, first motive means positioned forwardly of said first and second brackets and extending between the chassis and said tilting bed platform for actuating pivoting of said bed platform upwardly at the forward end thereof, a wheel lift positioned on said bed carrier below said first and second beams, said wheel lift including a swingable telescopic tube, a rearward end of said telescopic tube extending rearwardly of said bed carrier for lifting the wheels of a towed vehicle, tube pivot means supported by said first and second brackets for pivotally mounting the front end of said telescopic tube to said bed carrier so that said telescopic tube is swingable thereon, and second motive means extending between said bed carrier and said telescopic tube for actuating swinging of said tube relative to said bed carrier and the chassis.

9. Apparatus as set forth in claim 8 wherein, said first and said second motive means include hydraulic cylinders.

10. Apparatus as set forth in claim 8 including, said tilting bed platform being slidably mounted on said first and second elongated beams.

11. Apparatus as set forth in claim 8 including, low friction plastic strips positioned between said tilting bed platform and said first and second beams to permit sliding of said tilting bed platform relative to said first and second beams.

12. A combination tilting bed carrier and attached wheel lift apparatus for mounting on a chassis of a towing vehicle comprising, a bed carrier for supporting vehicles in towing, first pivot means positioned on said bed carrier for pivotally connected said bed carrier to the chassis, first motive means extending between the chassis and said bed carrier for actuating tilting of said bed carrier about said first pivot means relative to the chassis, a wheel lift positioned below said bed carrier and extending rearwardly thereof, second pivot means positioned on said bed carrier for pivotally connecting said wheel lift to said bed carrier, and second motive means extending between said wheel lift and said bed carrier for actuating tilting of said wheel lift about said second pivot means relative to said bed carrier and the chassis.

13. Apparatus as set forth in claim 12, wherein said bed carrier further includes first and second elongated beams and said apparatus further includes a slidable platform supported on said beams and low friction strips positioned between said platform and said beams to permit sliding of said platform relative to said beams.

* * * * *

UNITED STATES PATENT AND TRADEMARK OFFICE
CERTIFICATE OF CORRECTION

PATENT NO. : 5,061,147
DATED : October 29, 1991
INVENTOR(S) : RONALD R. NESPOR

It is certified that error appears in the above-identified patent and that said Letters Patent is hereby corrected as shown below:

Column 3, line 42, after "Number" insert --204,454--.

Column 5, line 46, claim 8, change "vehicle" to --vehicles--.

Column 6, line 5, claim 8, change the first occurrence of "said" to --side--.

Column 6, line 41, claim 12, change "connected" to --connecting--.

Signed and Sealed this

Twenty-third Day of March, 1993

*Attest:*

STEPHEN G. KUNIN

*Attesting Officer*   Acting Commissioner of Patents and Trademarks

REEXAMINATION CERTIFICATE (3137th)

United States Patent [19]

Nespor

[11] B1 5,061,147
[45] Certificate Issued *Feb. 25, 1997

[54] VEHICLE CARRIER WITH WHEEL LIFT

[75] Inventor: Ronald R. Nespor, Sharpsville, Pa.

[73] Assignee: Chevron, Inc., Mercer, Pa.

Reexamination Requests:
No. 90/003,653, Dec. 5, 1994
No. 90/003,749, Mar. 15, 1995

Reexamination Certificate for:
Patent No.: 5,061,147
Issued: Oct. 29, 1991
Appl. No.: 538,742
Filed: Jun. 15, 1990

[*] Notice: The portion of the term of this patent subsequent to May 29, 2007, has been disclaimed.

Certificate of Correction issued Mar. 23, 1993.

Related U.S. Application Data

[63] Continuation of Ser. No. 288,854, Dec. 23, 1988, abandoned, which is a continuation of Ser. No. 204,642, Jun. 9, 1988, Pat. No. 4,929,142.

[51] Int. Cl.$^6$ .................................................. B60J 9/00
[52] U.S. Cl. .................... 414/563; 280/402; 414/480; 298/12
[58] Field of Search .................... 414/563, 477, 414/478, 479, 480, 426, 427, 428, 429; 298/12, 13, 14, 15, 16, 17 B; 280/402

[56] References Cited

U.S. PATENT DOCUMENTS

| | | |
|---|---|---|
| 1,113,191 | 10/1914 | Breese . |
| 1,858,797 | 5/1932 | Wood et al. . |
| 1,929,112 | 10/1933 | Hansen . |
| 1,931,746 | 10/1933 | Allsworth et al. . |
| 2,065,833 | 12/1936 | Stratton et al. . |

(List continued on next page.)

FOREIGN PATENT DOCUMENTS

| | | |
|---|---|---|
| 260213 | 5/1964 | Australia . |
| 807549 | 10/1935 | France . |
| 2546828 | 12/1984 | France . |
| 535506 | 9/1931 | Germany . |
| 760688 | 11/1956 | United Kingdom . |
| 1407262 | 9/1975 | United Kingdom . |
| 2145047A | 3/1985 | United Kingdom . |
| 2150902A | 7/1985 | United Kingdom . |

OTHER PUBLICATIONS

NCR Industries, Inc. Car Carrier brochure, dated Jun. 15, 1987.

Landoll Corporation "Loadoll Wheel Lift for America's No. 1 Carrier" brochure, dated 1988.

Holmes International, Inc. "Traditional Concept Advanced Design 220S, New 22-Foot Steel Car Carrier from Holmes" brochure, dated 1988.

Century Wrecker Corporation "New From Century, 17' Aluminum Car Carrier" brochure, date unknown.

Feb. 28, 1992, letter from counsel for Kilar/Tiger, with enclosures.

May 15, 1995, letter from counsel for Kilar/Tiger, with enclosures.

Aug. 7, 1995, letter from counsel for Kilar/Tiger, with enclosures.

Feb. 6, 1992, letter from Terrance Radar, counsel for Jerr-Dan, with enclosures.

(List continued on next page.)

*Primary Examiner*—Frank E. Werner

[57] ABSTRACT

A combination tilting bed carrier and attached wheel lift for mounting on a chassis of a towing vehicle wherein the bed carrier is pivotably connected to the chassis and first motive devices extend between the chassis and the bed carrier for tilting the bed carrier. The wheel lift is positioned below the bed carrier and pivotably connected thereto. Second motive devices extend between the wheel lift and the bed carrier for independently tilting the wheel lift relative to the bed carrier and the chassis.

U.S. PATENT DOCUMENTS

| Number | Date | Name | Ref |
|---|---|---|---|
| 2,113,879 | 4/1938 | Delalandre . | |
| 2,183,478 | 12/1939 | Holmes et al. | 212/141 |
| 2,194,403 | 3/1940 | Novotney . | |
| 2,462,868 | 3/1949 | Ives . | |
| 2,468,220 | 4/1949 | McLendon . | |
| 2,509,167 | 5/1950 | Pla | 298/12 |
| 2,613,827 | 10/1952 | Van Doorne . | |
| 2,621,814 | 12/1952 | Lisota . | |
| 2,624,484 | 1/1953 | Dalton . | |
| 2,630,929 | 3/1953 | Pearson . | |
| 2,683,545 | 7/1954 | Wood . | |
| 2,703,658 | 3/1955 | Bazzell . | |
| 2,726,777 | 12/1955 | Wiley . | |
| 2,850,187 | 9/1958 | Roberts . | |
| 3,159,294 | 12/1964 | Forsythe . | |
| 3,182,829 | 5/1965 | Wagner . | |
| 3,375,946 | 4/1968 | Drake . | |
| 3,430,792 | 3/1969 | Grove et al. . | |
| 3,434,607 | 3/1969 | Nelson . | |
| 3,450,282 | 6/1969 | Ezolt . | |
| 3,550,801 | 4/1970 | Larson . | |
| 3,589,537 | 6/1971 | Petersen . | |
| 3,613,919 | 10/1971 | Ceepe et al. . | |
| 3,667,631 | 6/1972 | Bishop . | |
| 3,690,482 | 9/1972 | Gaumont . | |
| 3,883,020 | 5/1975 | Dehn . | |
| 3,951,280 | 4/1976 | Peck . | |
| 4,015,879 | 4/1977 | Shonkwiler . | |
| 4,222,698 | 9/1980 | Boelter | 414/477 |
| 4,239,275 | 12/1980 | Horneys et al. . | |
| 4,318,657 | 3/1982 | Znidaric . | |
| 4,353,597 | 10/1982 | Shoup . | |
| 4,368,002 | 1/1983 | Krzyzosiak, Jr. . | |
| 4,456,420 | 6/1984 | Newhard . | |
| 4,473,237 | 9/1984 | Lind . | |
| 4,557,496 | 10/1985 | Sill | 280/402 |
| 4,637,623 | 1/1987 | Bubik | 280/402 |
| 4,679,978 | 7/1987 | Holmes et al. . | |
| 4,741,661 | 5/1988 | Carey | 414/563 |
| 4,750,856 | 6/1988 | Lapiolahti . | |
| 4,758,128 | 7/1988 | Law . | |
| 4,761,015 | 8/1988 | Carr . | |
| 4,770,592 | 9/1988 | Winter . | |
| 4,775,285 | 10/1988 | Zackovich | 414/563 |
| 4,793,763 | 12/1988 | Bubik . | |
| 4,795,303 | 1/1989 | Bubik . | |
| 4,797,057 | 1/1989 | Shoup et al. | 414/563 |
| 4,798,509 | 1/1989 | Bubik . | |
| 4,815,915 | 3/1989 | Crupi, Jr. | 414/563 |
| 4,875,822 | 10/1989 | Nespor . | |
| 4,927,315 | 5/1990 | Nespor . | |

OTHER PUBLICATIONS

Plaintiff's Initial 35 U.S.C. & 282 Notice With Respect To U.S. Pat. No. 5,061,147, Oct. 3, 1996.

Holmes Pro–Star Brochure, 1986.

Holmes 175 Brochure, May, 1988.

Jerr–Dan Brochure, Sep. 1, 1981.

Century Wrecker Corporation document entitled "22' Steel Carrier".

Jerr–Dan Corp. "Wrangler Lite (O.S.) Operation, Maintenance, and Parts Manual," dated Nov. 4, 1986.

Jerr–Dan® "Wrangler II & III" brochure, Jerr–Dan Corp., dated 1986, (color photocopies submitted).

Jerr–Dan® "Raise Revenue" brochure, Jerr–Dan Corp. (undated; color photocopies submitted).

No mar® "17' Aluminum Slide Back Model TSA17" brochure, E. R. Buske Mfg. Co., Inc. (undated but published at least as of Aug. 1987; color photocopies submitted).

No mar® "TSS–21" brochure, E. R. Buske Mfg. Co., Inc. (undated, but published at least as of Aug. 1987; color photocopies submitted).

1987 Century Owners Manual (Exhibit 2).

Jun. 1987 Century Brochure (Exhibit 3).

Chevron Inc. "30,000 Pound Transporter" brochure showing transporters with rear stabilier (undated but published before Jun. 9, 1987; color photocopies submitted).

FIGS. A & B depicting the stabilizer shown in the above Chevron brochure.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–11 is confirmed.

Claims 1, 12 and 13 are cancelled.

New claims 14–45 are added and determined to be patentable.

*14. A combination tilting bed carrier and attached wheel lift apparatus for mounting on a chassis of a towing vehicle comprising,*

*a bed carrier having a movably mounted bed, for supporting a vehicle in tow, said bed carrier being movable between an untilted and a tilted position,*

*a first pair of pivot points positioned laterally, oppositely of one another on said bed carrier for pivotally connecting said bed carrier to the chassis,*

*first motive means extending between the chassis and said bed carrier for actuating tilting of said bed carrier about said first pair of pivot points relative to said chassis,*

*a wheel lift positioned below said bed carrier and extending rearwardly thereof,*

*a second pair of pivot points positioned laterally, oppositely of one another on said bed carrier for pivotally connecting said wheel lift to said bed carrier, and*

*second motive means extending between said wheel lift and a pivot on said bed carrier which is fixed relative to said bed carrier, for actuating tilting of said wheel lift about said second pair of pivot points relative to said bed carrier and the chassis,*

*said second pair of pivot points being fixed relative to said first pair of pivot points,*

*said second pair of pivot points and said second motive means being constructed and positioned such that said wheel lift can be rotated to a wheel engaging position when said bed carrier is in said untilted position, thereby permitting loading of said vehicle in tow onto said wheel lift without having to substantially tilt said bed carrier.*

*15. Apparatus as set forth in claim 14 wherein, said second motive means is connected to said wheel lift rearwardly of said second pair of pivot points.*

*16. Apparatus as set forth in claim 15 wherein, a first distance is defined between said second pair of pivot points and a rear end of the bed carrier;*

*a second distance is defined between said second pair of pivot points and a connection of said second motive means to said wheel lift; and*

*said second distance is at least one-half said first distance.*

*17. Apparatus as set forth in claim 14 wherein, said wheel lift is movable between a raised and a lowered position;*

*said second motive means is movable between a retracted and an extended position; and*

*said wheel lift is in said raised position when said second motive means is in retracted position and said wheel lift is in said lowered position when said second motive means is in said extended position.*

*18. Apparatus as set forth in claim 14 wherein, said wheel lift is pivotally connected to said bed carrier proximate a front end of said wheel lift.*

*19. Apparatus as set forth in claim 14 wherein, said wheel lift includes a boom and a telescopic tube extending rearwardly therefrom, with said boom connected to said bed carrier and said second motive means.*

*20. A combination tilting bed carrier and attached wheel lift apparatus for mounting on a chassis of a towing vehicle comprising,*

*a bed carrier having a movably mounted bed, for supporting a vehicle in tow, said bed carrier being movable between an untilted and a tilted position,*

*first pivot means positioned on said bed carrier for pivotally connecting said bed carrier to the chassis,*

*first motive means extending between the chassis and said bed carrier for actuating tilting of said bed carrier about said first pivot means relative to the chassis,*

*a wheel lift positioned below said bed carrier and extending rearwardly thereof,*

*second pivot means positioned on said bed carrier for pivotally connecting said wheel lift to said bed carrier, and*

*second motive means extending between said wheel lift and a pivot on said bed carrier which is fixed relative to said bed carrier, for actuating tilting of said wheel lift about said second pivot means relative to said bed carrier and the chassis,*

*said second pivot means being fixed relative to said first pivot means,*

*said second pivot means and said second motive means being constructed and positioned such that said wheel lift can be rotated to a wheel engaging position when said bed carrier is in said untilted position, thereby permitting loading of said vehicle in tow onto said wheel lift without having to substantially tilt said bed carrier.*

*21. Apparatus as set forth in claim 20 wherein, said second motive means is connected to said wheel lift rearwardly of said second pivot means.*

*22. Apparatus as set forth in claim 21 wherein, a first distance is defined between said second pivot means and a rear end of the bed carrier;*

*a second distance is defined between said second pivot means and a connection of said second motive means to said wheel lift; and*

*said second distance is at least one-half said first distance.*

*23. Apparatus as set forth in claim 20 wherein, said wheel lift is movable between a raised and a lowered position;*

*said second motive means is movable between a retracted and an extended position; and*

*said wheel lift is in said raised position when said second motive means is in said retracted position and said* wheel lift is in said lowered position and said second motive means is in said extended position.

24. Apparatus as set forth in claim 20 wherein, said wheel lift is pivotally connected to said bed carrier proximate a front end of said wheel lift.

25. Apparatus as set forth in claim 20 wherein, said wheel lift includes a boom and a telescopic tube extending rearwardly therefrom, with said boom pivotally connected to both said bed carrier and said second motive means.

26. A combination tilting bed carrier and attached wheel lift apparatus for mounting on a chassis of a towing vehicle comprising, a bed carrier having a movably mounted bed, for supporting a vehicle in tow, first pivot means positioned on said bed carrier for pivotally connecting said bed carrier to the chassis, first motive means extending between the chassis and said bed carrier for actuating tilting of said bed carrier about said first pivot means relative to the chassis, a wheel lift positioned below said bed carrier, extending rearwardly thereof, and movable between a raised and a lowered position, second pivot means positioned on said bed carrier for pivotally connecting said wheel lift to said bed carrier, and second motive means extending between said wheel lift and a pivot on said bed carrier which is fixed relative to said bed carrier, for actuating tilting of said wheel lift about said second pivot means relative to said bed carrier and the chassis, said second motive means being movable between a retracted and an extended position, said second motive means being connected to said wheel lift rearwardly of said second pivot means such that said wheel lift is in said raised position when said second motive means is in said retracted position and said wheel lift is in said lowered position when said second motive means is in said extended position.

27. Apparatus as set forth in claim 26, wherein said bed carrier has a subframe on which said bed slidably moves.

28. Apparatus as set forth in claim 27, wherein said subframe comprises two elongated beams.

29. Apparatus as set forth in claim 27 wherein said first and second pivot means are connected to said subframe by a common structural member.

30. Apparatus as set forth in claim 26, wherein said second pivot means are positioned on a bracket extending downwardly from said bed carrier.

31. Apparatus as set forth in claim 30, wherein said first pivot means are also positioned on said bracket such that said bracket is connected to the chassis.

32. Apparatus as set forth in claim 30, wherein said bracket is rigidly connected to said bed carrier so that it rotates with said bed carrier.

33. Apparatus as set forth in claim 26, wherein said second pivot means includes an axle, whereby said wheel lift pivots on said axle.

34. A combination tilting bed carrier and attached wheel lift apparatus for mounting on a chassis of a towing vehicle comprising, a bed carrier having a movably mounted bed, for supporting a vehicle in tow, first pivot means positioned on said bed carrier for pivotally connecting said bed carrier to the chassis, first motive means extending between the chassis and said bed carrier for actuating tilting of said bed carrier about said first pivot means relative to the chassis, a wheel lift positioned below said bed carrier, extending rearwardly thereof, said wheel lift having a most rearward portion, second pivot means positioned on said bed carrier for pivotally connecting said wheel lift to said bed carrier, and second motive means extending between said wheel lift and a pivot on said bed carrier which is fixed relative to said bed carrier, for actuating tilting of said wheel lift about said second pivot means relative to said bed carrier and the chassis, said second pivot means being fixed relative to said first pivot means, said second pivot means and said second motive means being constructed and positioned such that said most rearward portion of said wheel lift can be rotated past horizontal to a wheel engaging position without substantially tilting said bed carrier.

35. Apparatus as set forth in claim 34, wherein said bed carrier has a subframe on which said bed slidably moves.

36. Apparatus as set forth in claim 35, wherein said subframe comprises two elongated beams.

37. Apparatus as set forth in claim 35, wherein said first and second pivot means are connected to said subframe by a common structural member.

38. Apparatus as set forth in claim 34, wherein said second pivot means are positioned on a bracket extending downwardly from said bed carrier.

39. Apparatus as set forth in claim 38, wherein said first pivot means are also positioned on said bracket such that said bracket is connected to the chassis.

40. Apparatus as set forth in claim 38, wherein said bracket is rigidly connected to said bed carrier so that it rotates with said bed carrier.

41. Apparatus as set forth in claim 34, wherein said second pivot means includes an axle, whereby said wheel lift pivots on said axle.

42. A combination tilting bed carrier and attached wheel lift apparatus for mounting on a chassis of a towing vehicle comprising, a bed carrier having a movably mounted bed, for supporting a vehicle in tow, first pivot means positioned on said bed carrier for pivotally connecting said bed carrier to the chassis, first motive means extending between the chassis and said bed carrier for actuating tilting of said bed carrier about said first pivot means relative to the chassis, a wheel lift positioned below said bed carrier, extending rearwardly thereof, said wheel lift having a most rearward portion, second pivot means positioned on said bed carrier for pivotally connecting said wheel lift to said bed carrier, second motive means extending between said wheel lift and a pivot on said bed carrier which is fixed relative to said bed carrier, for actuating tilting of said wheel lift about said second pivot means relative to said bed carrier and the chassis, and said second pivot means being fixed relative to said first pivot means, means for rotating said wheel lift such that said most rearward portion of said wheel lift can reach a wheel engaging position without substantially tilting said bed carrier.

43. A combination tilting bed carrier and attached wheel lift apparatus for mounting on a chassis of a towing vehicle comprising, a bed carrier having a movably mounted bed, for supporting a vehicle in tow, said bed carrier being movable between an untilted and a tilted position, first pivot means positioned on said bed carrier for pivotally connecting said bed carrier to the chassis, first motive means extending between the chassis and said bed carrier for actuating tilting of said bed carrier about said first pivot means relative to the chassis, a wheel lift positiond below said bed carrier and extending rearwardly thereof, second pivot means positioned on said bed carrier for pivotally connecting said wheel lift to said bed carrier, and second motive means extending between said wheel lift and said bed carrier, for actuating tilting of said wheel lift about said second pivot means relative to said bed carrier and the chassis, said second pivot means being fixed relative to said first pivot means, said second pivot means and said second motive means being constructed and positioned such that said wheel lift can be rotated to a wheel engaging position when said bed carrier is in said untilted position, thereby permitting loading of said vehicle in tow onto said wheel lift without having to substantially tilt said bed carrier.

44. Apparatus as set forth in claim 43, wherein said second motive means is pivotally connected to said bed carrier.

45. Apparatus as set forth in claim 44, wherein said pivotal connection of said second motive means to said bed carrier is fixed relative to said bed carrier.

* * * * *